(12) United States Patent
Rodon et al.

(10) Patent No.: US 10,167,111 B2
(45) Date of Patent: Jan. 1, 2019

(54) TAMPER-EVIDENT REUSABLE PACKAGE CLOSURE

(71) Applicant: Velcro BVBA, Deinze (BE)

(72) Inventors: Enric Rodon, Barcelona (ES); Josep Maria Soler Carbonell, Canet de Mar (ES)

(73) Assignee: VELCRO BVBA, Deinze (BE)

( * ) Notice: Subject to any disclaimer, the term of this patent is extended or adjusted under 35 U.S.C. 154(b) by 845 days.

(21) Appl. No.: 14/576,959

(22) Filed: Dec. 19, 2014

(65) Prior Publication Data
US 2016/0176572 A1 Jun. 23, 2016

(51) Int. Cl.
*B65D 17/00* (2006.01)
*A47K 10/32* (2006.01)
(Continued)

(52) U.S. Cl.
CPC ............ *B65D 17/166* (2013.01); *A47K 10/32* (2013.01); *B65D 17/4014* (2018.01); *B65D 25/205* (2013.01); *B65D 43/16* (2013.01); *B65D 43/22* (2013.01); *B65D 51/20* (2013.01); *B65D 75/5838* (2013.01); *A47K 2010/3266* (2013.01); *B65D 2251/009* (2013.01);
(Continued)

(58) Field of Classification Search
CPC .... B65D 17/166; B65D 25/205; B65D 43/16; B65D 43/22; B65D 75/5838; B65D 17/4014; A47K 10/32; A47K 2010/3266
USPC ................................ 206/494, 233; 220/258.2
See application file for complete search history.

(56) References Cited

U.S. PATENT DOCUMENTS

| 4,156,493 A | 5/1979 | Julius |
| 4,691,373 A | 9/1987 | Ausnit |

(Continued)

FOREIGN PATENT DOCUMENTS

| DE | 20304113 U | 6/2003 |
| EP | 0307924 A2 | 3/1989 |

(Continued)

OTHER PUBLICATIONS

International Search Report and Written Opinion received for PCT Application No. PCT/EP2015/077968. dated Mar. 18, 2016. 11 pages.

(Continued)

*Primary Examiner* — Steven A. Reynolds
(74) *Attorney, Agent, or Firm* — Finch & Maloney PLLC

(57) ABSTRACT

A reusable closure system is disclosed for packaging applications. The closure system generally includes a base and hinged lid. The base is bondable to a package and includes a field of touch fasteners having one or more cut-lines therein defining a hinged pull-tab assembly. The lid includes a complementary touch fastener field and can be placed in the open position to expose the pull-tab assembly, which can then be peeled back to open the package by virtue of the bond between the pull-tab assembly and a frangible region in the package. After opening, the pull-tab assembly can be stowed to the lid, so as to provide a lid-based plug corresponding to the package hole. Optional tamper-evident elements allow a consumer to see the package has not yet been opened. Stay-open lid and anti-peel mechanisms may also be provided. A dispensable roll/fanfold of the closures can feed a flow-wrap packaging process.

20 Claims, 9 Drawing Sheets

(51) Int. Cl.
  *B65D 25/20* (2006.01)
  *B65D 43/16* (2006.01)
  *B65D 43/22* (2006.01)
  *B65D 51/20* (2006.01)
  *B65D 75/58* (2006.01)
  *B65D 17/28* (2006.01)

(52) U.S. Cl.
  CPC ............... *B65D 2251/0021* (2013.01); *B65D 2251/0028* (2013.01); *B65D 2251/0071* (2013.01); *B65D 2313/02* (2013.01); *Y02W 30/807* (2015.05)

(56) References Cited

U.S. PATENT DOCUMENTS

| | | | |
|---|---|---|---|
| 4,794,028 A | 12/1988 | Fischer | |
| 4,824,261 A | 4/1989 | Provost | |
| 4,848,575 A | 7/1989 | Nakamura et al. | |
| 4,887,338 A | 12/1989 | Handler | |
| 4,946,289 A | 8/1990 | Bolling et al. | |
| 5,260,015 A | 11/1993 | Kennedy et al. | |
| 5,362,299 A | 11/1994 | Schou | |
| 5,436,051 A | 7/1995 | Donaruma et al. | |
| 5,595,786 A | 1/1997 | McBride, Jr. et al. | |
| 5,687,875 A | 11/1997 | Watts et al. | |
| 5,725,311 A | 3/1998 | Ponsi et al. | |
| 5,964,399 A | 10/1999 | Ruben | |
| 6,026,953 A | 2/2000 | Nakamura et al. | |
| 6,065,591 A | 5/2000 | Dill et al. | |
| 6,113,271 A | 9/2000 | Scott et al. | |
| D447,054 S | 8/2001 | Hill | |
| 6,420,006 B1 | 7/2002 | Scott | |
| 6,428,867 B1 | 8/2002 | Scott et al. | |
| 6,589,622 B1 | 7/2003 | Scott | |
| 6,671,935 B2 | 1/2004 | Filion et al. | |
| 6,687,962 B2 | 2/2004 | Clarner et al. | |
| 6,737,147 B2 | 5/2004 | Kennedy et al. | |
| 6,783,834 B2 | 8/2004 | Shepard et al. | |
| RE38,652 E | 11/2004 | Provost | |
| 6,834,773 B2 | 12/2004 | Wu | |
| 6,991,375 B2 | 1/2006 | Clune et al. | |
| 6,991,843 B2 | 1/2006 | Armela et al. | |
| 6,996,880 B2 | 2/2006 | Kurtz, Jr. et al. | |
| 7,048,818 B2 | 5/2006 | Krantz et al. | |
| 7,344,744 B2 * | 3/2008 | Sierra-Gomez .... | B65D 75/5838 206/459.1 |
| 7,530,472 B2 | 5/2009 | Bitowft et al. | |
| 8,033,421 B2 | 10/2011 | Cowell et al. | |
| 8,051,540 B2 | 11/2011 | Gallant et al. | |
| 8,182,891 B2 | 5/2012 | Scott et al. | |
| 8,225,467 B2 | 7/2012 | Gallant et al. | |
| 8,448,305 B2 | 5/2013 | Gallant et al. | |
| 8,545,740 B2 | 10/2013 | Gallant et al. | |
| 8,549,714 B1 | 10/2013 | Shepard et al. | |
| 8,663,409 B2 | 3/2014 | Mueller | |
| 8,685,194 B2 | 4/2014 | Grady et al. | |
| 8,898,869 B2 | 12/2014 | Idrizovic et al. | |
| 9,394,085 B2 | 7/2016 | Nakano | |
| 9,475,615 B2 | 10/2016 | Schiermeier et al. | |
| 2001/0038016 A1 | 11/2001 | Russo | |
| 2005/0011906 A1 * | 1/2005 | Buck ................. | B65D 75/5833 221/64 |
| 2005/0117819 A1 | 6/2005 | Kingsford et al. | |
| 2006/0283750 A1 | 12/2006 | Villars et al. | |
| 2008/0116217 A1 | 5/2008 | Klein et al. | |
| 2009/0014459 A1 | 1/2009 | Hood et al. | |
| 2009/0090736 A1 | 4/2009 | Cowell et al. | |
| 2010/0001016 A1 | 1/2010 | Savage | |
| 2010/0108706 A1 | 5/2010 | Oman | |
| 2011/0147401 A1 | 6/2011 | Rubo et al. | |
| 2013/0032608 A1 | 2/2013 | Hood et al. | |
| 2013/0239371 A1 | 9/2013 | Shepard et al. | |
| 2013/0280474 A1 | 10/2013 | Medina et al. | |
| 2013/0318752 A1 | 12/2013 | Kheil et al. | |
| 2015/0239619 A1 | 8/2015 | Daffner et al. | |
| 2016/0176572 A1 | 6/2016 | Rodon et al. | |
| 2017/0021974 A1 | 1/2017 | Lemmons et al. | |
| 2017/0247157 A1 | 8/2017 | Parellada Armela et al. | |

FOREIGN PATENT DOCUMENTS

| | | |
|---|---|---|
| EP | 1090852 A1 | 4/2001 |
| JP | 2012035897 A | 2/2012 |
| WO | 198702646 | 5/1987 |
| WO | 199530599 | 11/1995 |
| WO | 2013100098 A1 | 7/2013 |
| WO | 2015/173171 A1 | 11/2015 |
| WO | 2016096378 A1 | 6/2016 |

OTHER PUBLICATIONS

International Search Report and Written Opinion received for PCT Application No. PCT/EP2015/060314. dated Aug. 6, 2015. 11 pages.
Guide to Flow Wrapping, Bosch Packaging Technology, Inc., (www.boshpackaging.com.) First Edition, 2011. 30 pages.
High Technology Hook, Velcro Industries B.V. 2011. 2 pages.
PRESS-LOK™—Self Engaging Press Fastener—Interlocking Hook-to-Hook Closure System Ideal for Packaging, Velcro Industries B.V. 2011. 4 pages.
International Preliminary Report on Patentability received for PCT/EP2015/060314. dated Nov. 15, 2016. 7 pages.
International Preliminary Report on Patentability received for PCT Application No. PCT/EP2015/077968. dated Jun. 20, 2017. 6 pages.

* cited by examiner

TAMPER-EVIDENT REUSABLE PACKAGE CLOSURE

BACKGROUND

Oftentimes a given consumable product is packaged within a container, and can be accessed by opening a reusable closure of the container. Once the consumer is done accessing the product, the closure can be closed so as to allow the unused portion of product within the container to remain usable at a later time. Example products that are commonly so packaged are moistened towelettes or so-called wet wipes. The towelettes may be, for example, treated with a gentle cleaning agent, antibacterial, or medicament designed or otherwise suitable for contact with human skin. In early such packaging designs, the container was typically a rigid plastic container configured with a similarly rigid hinged lid. In more recent years, the advent of so-called flow-pack or flow-wrapping packaging techniques have allowed such product containers to be formed with a bag-like container made of flexible material such as polyester or polypropylene combined with a sealant layer of low density polyethylene (LDPE). In some such cases, the closure is a molded rigid plastic assembly that is adhered to the bag, the closure generally including a hinged lid that can be raised to provide access to an underlying hole in the bag, and lowered to a closed position. In other such cases, the closure is a flexible plastic lid-like flap that is adhered to the bag and over the underlying hole via an adhesive. The flap can be peeled open to access product within the bag and pressed back down on the bag to a closed position.

Figure 1A:
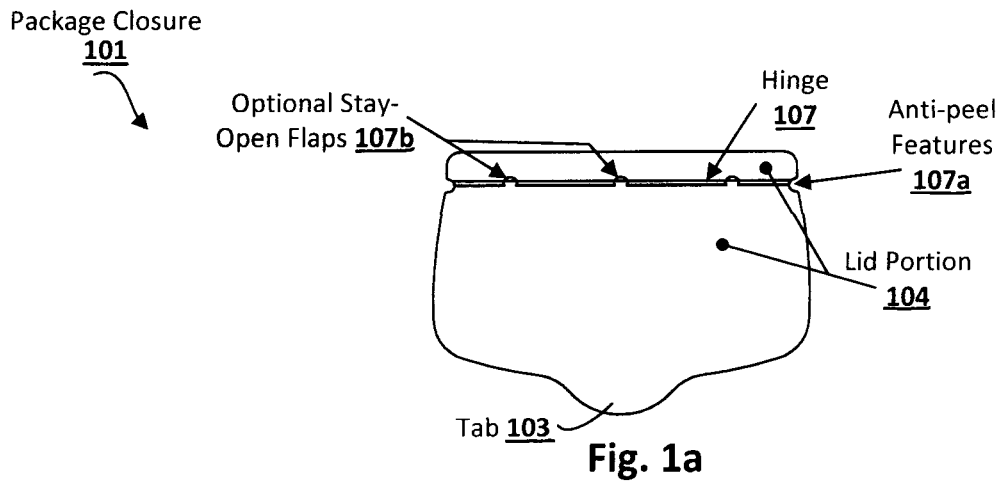
FIG. 1a illustrates a top view of a reusable package closure system configured in accordance with an embodiment of the present disclosure.

As will be appreciated in light of this disclosure, the figures are not necessarily drawn to scale or intended to limit the described embodiments to the specific example configurations shown.

DETAILED DESCRIPTION

A reusable closure system is disclosed for packaging applications. The closure system generally includes base and lid portions. The lid can be moved between open and closed positions relative to the base by operation of a hinge at corresponding edges of the base and lid. The base is configured to adhere to or otherwise be bonded to underlying package material and generally includes a first field of touch fasteners having one or more cut-lines therein defining a hinged pull-tab assembly, in accordance with an embodiment. A second touch fastener field that is complementary to the first touch fastener field is provided on the lid, such that the first and second touch fastener fields engage with one another to provide a secure closure when the lid is in the closed position. Upon initial opening of the package, the lid can be placed in the open position to expose the pull-tab assembly of the base. The pull-tab assembly includes a non-stick tab area that allows a user to grab and peel open the package by virtue of the bond between the pull-tab assembly and a pre-cut package hole (frangible region) in the underlying package. Once pulled-back to its hinge area, the pull-tab assembly can be securely stowed to the lid by way of the first and second touch fastener fields, such that when the lid is put back in the closed position, the stowed pull-tab assembly now operates as a lid-based plug that effectively seats into or otherwise covers the pre-cut package hole. In some embodiments, the pull-tab assembly is configured with one or more tamper-evident elements, so that a consumer can see the package has not yet been opened at time of purchase or first use. Other closure system features will be apparent in light of this disclosure, such as a stay-open lid mechanism and an anti-peel mechanism to prevent or otherwise inhibit complete removal of the lid. Various techniques are also disclosed for making the package closure systems described herein, as well as product packaging techniques that utilize the closure systems. Note the closure system can be provided separately from any packaging. For instance, in one embodiment, a plurality of the closure systems can be provided in a dispensable roll or fanfold (e.g., zig-zag fanfold pattern) stack or other suitable dispensable configuration that can readily be used to feed a flow-wrap packaging process.

For purposes of clarity, reference herein to a "frangible region" generally refers to the area that is manipulated or otherwise weakened so as to make the area bounded by the frangible region relatively easier to separate or otherwise remove so as to effectively make that area sacrificial. Frangibility can be brought about in a given material by any number of treatments that tend to diminish the ability of that material to stay intact when confronted with pulling forces (and/or pushing forces, as the case may be). Frangibility can be brought about in a material by, for example, perforating, thinning, heating, pressing, chemical treatment, and/or any other suitable processes whether they be physical or chemical in nature (or both). While the initial separation of the frangible area may require a greater force, the subsequent separation of the remaining frangible area may require a relatively lesser force given the nature of the separation forces at hand.

General Overview

As previously explained, typical flexible package closures are implemented as a molded rigid plastic assembly or a flexible plastic lid-like flap that is adhered to the package material and over an underlying hole via an adhesive. There are a number of non-trivial issues associated with such typical closures. For instance, while molded rigid plastic closures are robust, they tend to not provide a sufficient seal when in the closed position thereby giving rise to potential that the product within the package will be dried out or otherwise not properly stored. A closure having the flexible plastic lid-like flap may generally address such concerns at least initially, but tends to lose its capability to securely adhere to the underlying packaging after numerous open-close cycles. Furthermore, the hole in the packaging that provides access to the product is typically perforated and completely covered with the adhesive underlying the plastic flap. When the consumer lifts the flap of the packaging for the first time, the flap adhesive is intended to pull and remove the perforated portion of the packaging to which it is adhesively bonded. While such a configuration may generally work for its intended purpose, note that the adhesive straddles the perforation line and therefore tends to equally pull on the entire surface of the underlying packaging material, which can result in failure to successfully remove the perforated section without user intervention. In addition, some such closures may include one or more detachable components, which may present unwanted clutter or trash as well as a choking hazard, particularly in the case of a wet wipes package that is commonly used in the presence of an infant child.

Thus, and in accordance with an embodiment of the present disclosure, a reusable closure system is disclosed for packaging applications. The closure system generally includes a base portion and a lid portion, and can be implemented with hook and loop materials. The lid of the closure can be moved between open and closed positions relative to the base by operation of a hinge at corresponding edges of the base and lid. The underside of the base is configured to adhere to or otherwise be bonded to underlying package material and generally includes a first field of touch fasteners (e.g., loop material) having one or more cut-lines therein defining a hinged pull-tab assembly, in accordance with an embodiment. A second touch fastener field (e.g., hook material) that is complementary to the first touch fastener field is provided on the lid. Thus, the first and second touch fastener fields engage with one another to provide a secure closure when the lid is in the closed position.

Upon initial opening of the package, the lid can be placed in the open position to expose the pull-tab assembly. To this end, the holding force of the adhesive or other bond that holds the base to the underlying package is much stronger than the holding force between the hook and loop of the lid and base portions. The pull-tab assembly includes a non-stick tab area which is not bonded to the underlying package material, so as to allow a user to grab and peel open the package by virtue of the strong bond between the pull-tab assembly and a pre-cut package hole (frangible region) in the underlying package. Thus, the pulling force on the pull-tab assembly causes the frangible region to be separated from the remainder of the package thereby providing an access port to product within the package. The portion of the package material liberated by virtue of the frangible region may then remain attached to the pull-tab assembly and add to the plug-like qualities of that assembly. As will be appreciated in light of this disclosure, note that the holding force of the adhesive or other bond that holds the base to the underlying package is much stronger than the pulling force of the user tab-pulling action, but the pulling force of the user tab-pulling action is much greater than the holding force of the frangible region.

Once pulled-back to its hinge area, the pull-tab assembly can be securely stowed against the back of the lid by way of the first and second touch fastener fields. In this way, the stowed pull-tab assembly operates as a lid-based plug that effectively seats into the pre-cut package hole when the lid is put back in the closed position. In some embodiments, the plug portion of the pull-tab assembly is larger than the underlying pre-cut hole, so there is a perimeter of exposed package material about the pre-cut hole. In some embodiments, that exposed perimeter of material may further include adhesive to further help provide a good seal of the package when the lid is in the closed position. Note, however, that the holding force of that adhesive bond securing the plug portion to the underlying package is much weaker than the holding force between the hook and loop of the lid and base portions, thereby allowing the lid to be reopened when needed to access product within the package. In still other embodiments, the exposed perimeter of material may have no or otherwise reduced active adhesive, whether because no adhesive was provisioned in that area or because the adhesive in that area was deactivated (e.g., (e.g., via a varnish or lacquer treatment). The base portion of the closure system can be bonded, for example, over a pre-cut hole in packaging material via adhesive, an ultrasonic weld, thermal bond, or any other suitable bonding technique that will securely fasten the closure to the package material.

In some embodiments, the pull-tab assembly is configured with one or more tamper-evident elements, so that a consumer can see the package has not yet been opened at time of purchase or first use. The tamper-evident features may include, for instance, uncut portions or notches in the perimeter of the pull-tab assembly cut-line(s), such as a perforated cut that can be readily broken at initial use but is also tamper-evident. Alternatively, or in addition to, the tamper-evident features may include notches cut in the perimeter of the pull-tab assembly, wherein the notches lay flush only prior to the initial opening and cannot be reseated back to the flush position after initial opening. Alternatively, or in addition to, the tamper-evident features may include a feature that is removed after the first opening, such as something the user pulls or peels off and discards before accessing and pulling the pull-tab assembly 105 open to the stowed position. Numerous other tamper-evident features can be used, as will be appreciated in light of this disclosure.

The hinge may be implemented, for example, with a fold line, such as a thinned portion of the closure where the lid is joined to or otherwise integrally formed with the base portion. Alternatively, the hinge and lid can be integral with one another but exist separately from the base portion. In still other embodiments, each of the hinge, lid, and base can be implemented with separate layers or components that operatively engage to provide a hinging action. In some embodiments, the hinge may be biased or otherwise configured to stay in a desired open position when the lid touch fasteners are not engaged with the base touch fasteners. Numerous suitable hinging arrangements will be apparent in light of this disclosure.

The touch fastener fields may be implemented, for example, with any suitable combination of touch fasteners. For instance, the lid touch fastener field (or fields, as the case may be) may be configured with loop material and the base touch fastener fields can be implemented with hook material. Alternatively, the lid touch fastener field(s) may be configured with hook material and the base touch fastener fields can be implemented with loop material. Alternatively, both the lid and the base touch fastener fields can be configured with hook material. Alternatively, one or both of the lid and the base may include a combination of both hook and loop fields. In any such cases, the peel strength of the fields can be set to provide a functional closure. A higher peel strength can be implemented, for example, by providing a denser field of fasteners within the area defined by the frangible region, although any suitable technique for increasing peel strength can be used.

In some embodiments, the closure system can be formed using a label making process where the resulting supply of closures (or so-called labels) can then be used as a feed to a flow-wrap packaging process, wherein the closure system is disposed onto the packaging material as a semi-flexible or semi-rigid label. In some embodiments, the label-based closure system is fully formed when transferred to the packaging material during the flow-wrap process. In other embodiments, the label-based closure system can be transferred to the packaging material in a partially formed state. For instance, in one such embodiment, the label-based closure system is transferred to the packaging material fully formed except for the cut defining the pull-tab assembly. In such cases, note that the frangible region of the package and the pull-tab assembly can be formed simultaneously at some point after the label dispensing stage of the process, although in other embodiments they can be formed separately (in either case, note the lack of need for registration to align a pre-cut frangible region with a label-based closure). This simultaneous forming can be done, for example, using a rotary die cutter or other suitable cutting mechanism (e.g., flatbed die cutting system, laser cutting) configured to cut through the top touch fastener material and adhesive layers but only weaken or perforate the underlying package material. In such cases, the pull-tab assembly is effectively a line cut that is co-located with the frangible region. Numerous forming and deployment methods will be apparent in light of this disclosure.

Closure Structure

Figure 1B:
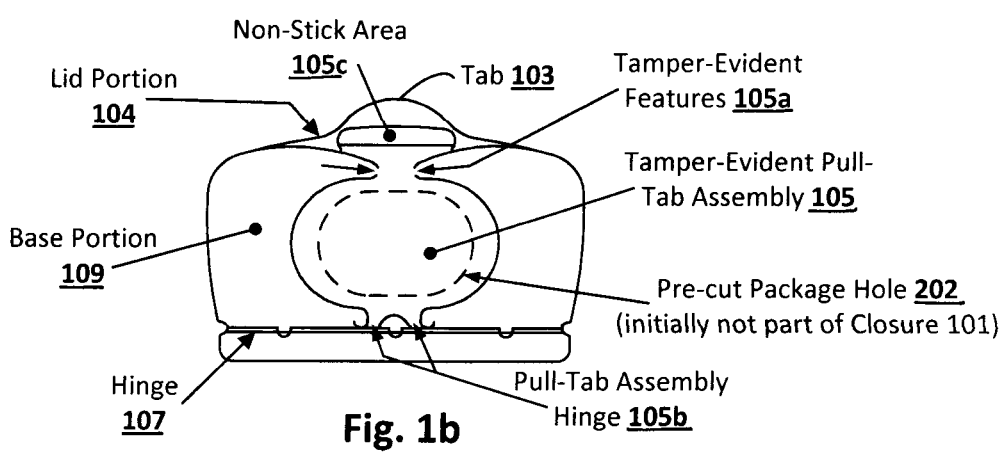
FIGS. 1b and 1b' each illustrates a bottom view of a reusable package closure system configured in accordance with an embodiment of the present disclosure.
Figure 1B:
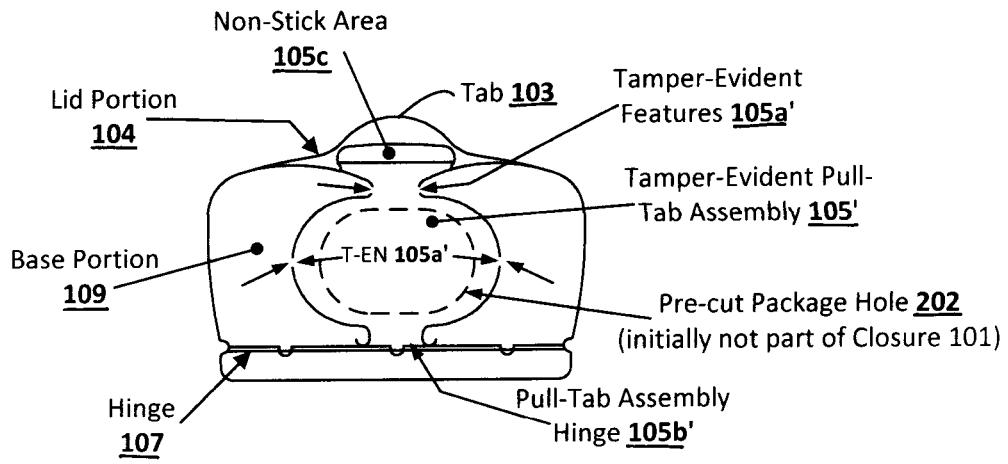
Figure 1C:
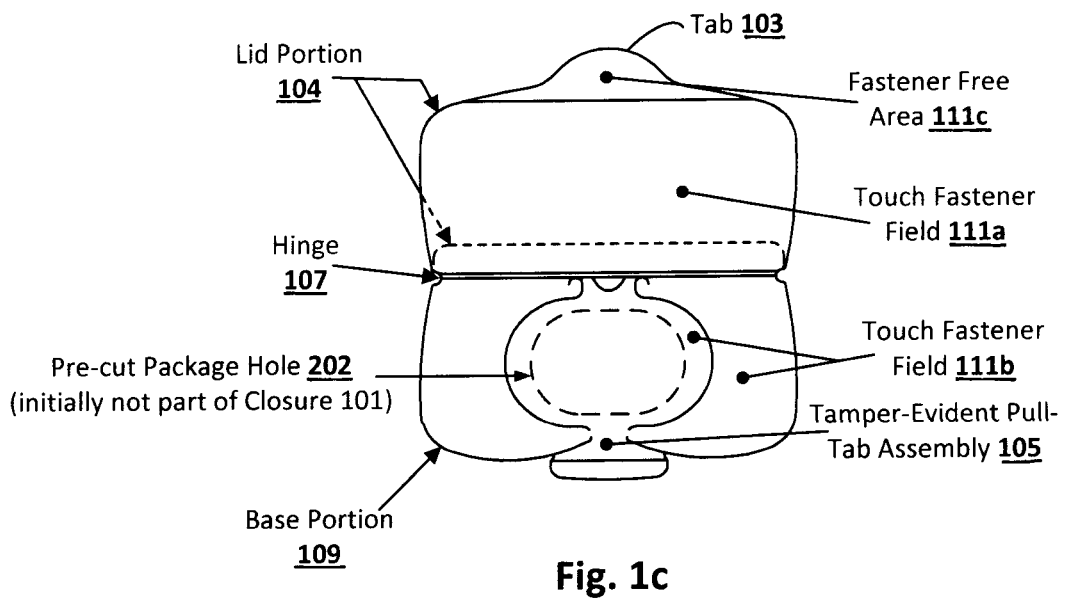
FIG. 1c illustrates a top view of an open reusable package closure system configured in accordance with an embodiment of the present disclosure.

FIGS. 1a-c respectively illustrate top, bottom, and perspective views of a reusable package closure system configured in accordance with an embodiment of the present disclosure. As can be seen, the closure 101 generally includes a lid portion 104 and a base portion 109. The base and lid of this example embodiment are operatively coupled to one another by a hinge 107. The lid 104 includes a tab 103 configured to assist in opening and closing operations. The tab 103 may be textured to provide a desirable tactile sensation and gripability. As can be seen in FIG. 1c, the lid 104 further includes a touch fastener field 111a, which in this example embodiment effectively covers the entire surface of the lid, except for a fastener free area 111c. The narrow lid area including the hinge 107 and the portion of the lid between the hinge and the nearby lid edge can also be fastener free, but need not be as will be appreciated in light of this disclosure. In other embodiments, note that the touch fastener field 111a may be deployed in one or more patterns or otherwise more selectively than shown, while still substantially maintaining the same function as provided herein.

The base 109 includes touch fastener field 111b, which in this example embodiment covers the entire surface of the base. However, just as with field 111a, the touch fastener field 111b may alternatively be deployed in one or more patterns or otherwise more selectively than shown, while still substantially maintaining the same function as provided herein. With further reference to the bottom view of FIG. 1b and perspective view of FIG. 1c, a cut-line in the base 109 defines the tamper-evident pull-tab assembly 105. As can be seen, the pull-tab assembly includes tamper-evident features 105, hinge 105b, and a non-stick tab area 105c that allows a user to grab and pull the pull-tab assembly 105 to open the underlying package. The pull-tab assembly 105 can be peeled back to its hinge and then stowed against the back of the lid 104 by way of the interface between the touch fastener fields 111a and 111b. The tamper-evident features 105a allow the user to know that the package has not yet been opened, to ensure freshness.

The tamper-evident features 105a can be implemented in any number of ways, such as pre-cut notches that remain fully seated until opened, or a perforated cut-line that leaves at least some of the pull-tab assembly perimeter uncut such that pulling of the assembly 105 will tear or otherwise break those uncut portions. In this example embodiment, only two locations of tamper-evident features are shown at the neck line near the non-stick area 105c. Other embodiments may include a greater number of such features and/or may place the features in different locations, as will be appreciated. For instance, tamper-evident pull-tab assembly 105' of FIG. 1b' includes two additional tamper-evident (T-EN) features 105a' in the body portion of the pull-tab assembly.

As can be further seen with respect to FIG. 1b, the hinge 105b is bi-furcated so as to reduce the hinged area, and may also be implemented with anti-peel features as will be appreciated in light of this disclosure. The two prongs of the hinge provide a spring-like quality when the pull-tab assembly 105 is stowed against the lid 104, and that spring-like quality assists in keeping the lid in an open position so as to not impede access to the product in the underlying package. In other embodiments, the hinge may be thicker, such as the case with pull-tab assembly 105' of FIG. 1b'. As can be seen, the hinge 105b' is not bifurcated so as to provide one continuous edge for the hinged area. Such an example embodiment may work similar to the embodiment shown in FIG. 1b, but the additional material in the hinge area may provide a lesser benefit with respect to the spring-like quality and an overall lower-quality user experience. In particular, the pull-tab assembly is ideally peeled back to the hinge line where the adhesive is close to permanent or otherwise assisted by anti-peel features. In any case, minimizing or otherwise reducing the contact area between the stowed pull-tab assembly (lid-based plug) 105 and the package tends to yield better performance.

The touch fastener fields 111a and 111b can be implemented with any suitable combination of fastening elements, including but not limited to woven, non-woven, knit, and molded elements. For instance, the lid touch fastener field(s) 111a may be configured with loop material and the base touch fastener field(s) 111b can be implemented with hook material. Alternatively, the lid touch fastener field(s) 111a may be configured with hook material and the base touch fastener field(s) 111b can be implemented with loop material. Alternatively, both the lid and the base touch fastener fields 111a and 111b can be configured with hook material so as to provide a hook-to-hook (or head-to-head, as the case may be) application. The fastener elements within a given field may generally include any suitable loop or hook geometry (e.g., stem and head configuration), depending on factors such as desired peel and shear strengths. For instance, the height and density of a loop field can be varied to suit a given hook profile, and the density and head-shape of hook elements can vary from one embodiment to the next (e.g., disc-shaped, mushroom-shaped, angled hook, one-way hook). U.S. Pat. Nos. 6,687,962, 8,225,467, 8,448,305, 8,685,194, 8,663,409, 7,048,818, 6,991,375, 6,991,843, 6,996,880, 6,783,834, RE38,652, 6,737,147, 6,671,935, 5,436,051, and 8,898,869, as well as U.S. Patent Publication Nos. 2013/0239371, 2013/0280474, and 2013/0318752 all disclose further details of example fastener element configurations that can be used as well as forming methods. Each of these applications is herein incorporated by reference in its entirety. The hook and loop materials (or hook and hook materials, as the case may be) may have any number of configurations, such as any of those produced by Velcro USA Inc. or any other brand of hook and loop touch fastener materials.

In some embodiments, the peel strength between fields 111a and 111b is uniform across the entire interface of 111a/111b. In other embodiments, note that the peel strength provided by the fields 111a and 111b may vary. For instance, in one example case, the peel strength within the area generally defined by the frangible region 202 can be relatively higher than other peel strengths provisioned outside of that area. Such increased peel strength may be helpful, for instance, in ensuring that the pull-tab assembly 105 stays stowed against the lid 104 after the initial opening. Further note, however, that such enhanced peel strength is not necessary for a functional closure 101. In the context of a touch fastener such as hook and loop or hook and hook configurations, peel strength generally refers to the resistance to stripping of one component from the other when a force normal to the mating surfaces is applied to the extremity of one of the components. Such peeling force on the component causes it to flex and progressively peel from the other. A higher peel strength can be implemented, for example, by at least one of providing a denser field of fastener elements within the area defined by the pull-tab assembly 105 or frangible region 202, modifying the geometry of the hook elements (e.g., providing mushroom or disk shaped heads to engage a loop or mesh material), and providing texture on the elements (e.g., dimpled or otherwise rough surface). In another example embodiment, the hook/loop area outside of the frangible region 202 can be treated (e.g., flattened out, cleaned, or eroded by means of heat or pressure or milling) to create a lower (softer) peel. Other mechanisms for providing varying degrees of peel strength will be apparent in light of this disclosure.

The lid 104 and base 109 can be integrally formed together with hinge 107, or formed separately and then operatively coupled with one another to form hinge 107. Each of the lid 104 and base 109 can be configured with a desired look and feel as well as a desired rigidity. In some embodiments, the lid 104 and base 109 are integrally formed with the hinge 107 by way of extrusion or laminating processes, or a combination of both extrusion and lamination. The example embodiment shown in FIGS. 1a-c is laminated, as evidenced by the hinge 107 and narrow strip of lid material that remains flat when the remaining lid portion is moved to an open position. An example lamination-based forming process will be discussed in turn with reference to FIGS. 3, 4, and 5a-c. An alternative embodiment where the lid-base-hinge assembly is provided by extrusion is configured with the hinge on respective edges of the lid 104 and base 109. An example extrusion-based forming process will be discussed in turn with reference to FIG. 6.

In some cases, each of the lid portion and base 109 are flexible, but more rigid than the underlying package material. The material from which the lid 104, hinge 107, and base 109 are made can be, for example, the same as the material from which the package is made (e.g., polyester or polypropylene). However, note that the lid 104 and base 109 can be made thicker so as to provide a greater degree of rigidity while still maintaining a degree of flexibility. In addition, note that stiffening agents, coatings, or other treatments can be used to provide a desired degree of rigidity. Such stiffening in accordance with an embodiment of the present disclosure provides a number of benefits. For example, the stiffness effectively isolates or otherwise distinguishes the closure system 101 from the less stiff package material and enhances the user's experience, by giving the closure 101 a different feel than the more supple and flimsy packaging material. Moreover, performance of the closure 101 can be better sustained over the whole life of the package. In contrast, a conventional plastic lid-like flap that is adhered to the bag and over the underlying hole via an adhesive is more prone to wear out and fail to properly secure the package, and becomes more difficult to use as the package contents are depleted and the package becomes flimsier and flimsier. In addition, the stiffness of the closure 101, in conjunction with other features described herein such as the plug-effect, is better suited for maintaining moisture of the packaged contents (such as a stack of wet wipes). In a more general sense, the lid portion 104, hinge 107, and base portion 109 can be made with any suitable materials using any suitable processes, wherein a degree of stiffness if provided in at least one of the lid 104 or base 109. In one such embodiment, the base 109 is implemented relatively stiffer than the package material (e.g., wherein the base has a thickness of about 200 µm and at least one stiffener layer). To this end, at least one of the lid and base can be at least 3× stiffer than the package material, or 4× stiffer than the package material, or 5× stiffer than the package material, and so on, up to a completely rigid closure. It is believed that a closure that exhibits a good degree of stiffness but still allows for some flexibility enhances the user experience, in accordance with an embodiment. In some embodiments, it may be desirable to have a transparent or semi-transparent lid 104, and the materials and forming process can be adjusted accordingly.

As can be further seen with reference to FIG. 1a, the hinge 107 may be configured with one or more anti-peel features 107a and one or more stay-open flaps 107b. The anti-peel features help prevent the lid 104 from being inadvertently ripped off during an opening procedure. The stay-open flaps 107b are configured to make the lid 104 stay in the open position, so as to form an obtuse angle with respect to the base 109. This way, the lid 104 will not impede the user's access to the product within the package and accessible by the hole in the package. Further details of the hinge features will be discussed in turn, with reference to FIGS. 2c and 7a-b.

In one specific embodiment, the lid touch fastener field 111a is implemented with VELCRO® brand UM-830 hook material and the base touch fastener field 111b is implemented with VELCRO® brand Velour-3905 loop material. In another specific embodiment, the lid touch fastener field 111a is implemented with VELCRO® brand UM-847 hook material and the base touch fastener field 111b is implemented with VELCRO® brand Velour-3969 loop material or a brush loop material of roughly 50 gsm to 100 gsm and having a film backing (e.g., high density polyethylene). In another such case, the lid touch fastener field 111a generally corresponding to the area where the pull-tab assembly 105 will be stowed after initial opening is implemented with VELCRO® brand UM-847 having a first density of hook elements and the lid touch fastener field 111a outside that stowing area is implemented with VELCRO® brand UM-847 having a second density of hook elements. Such a configuration can provide different peel strength within the area generally defined by the pull-tab assembly 105 or frangible region 202, relative to the peel strength outside that area. Other embodiments may include similar fastener material systems, but with those fastener material systems oppositely deployed on the lid and base portions 105 and 109. Any suitable touch fastener configurations can be used.

Figure 2A:
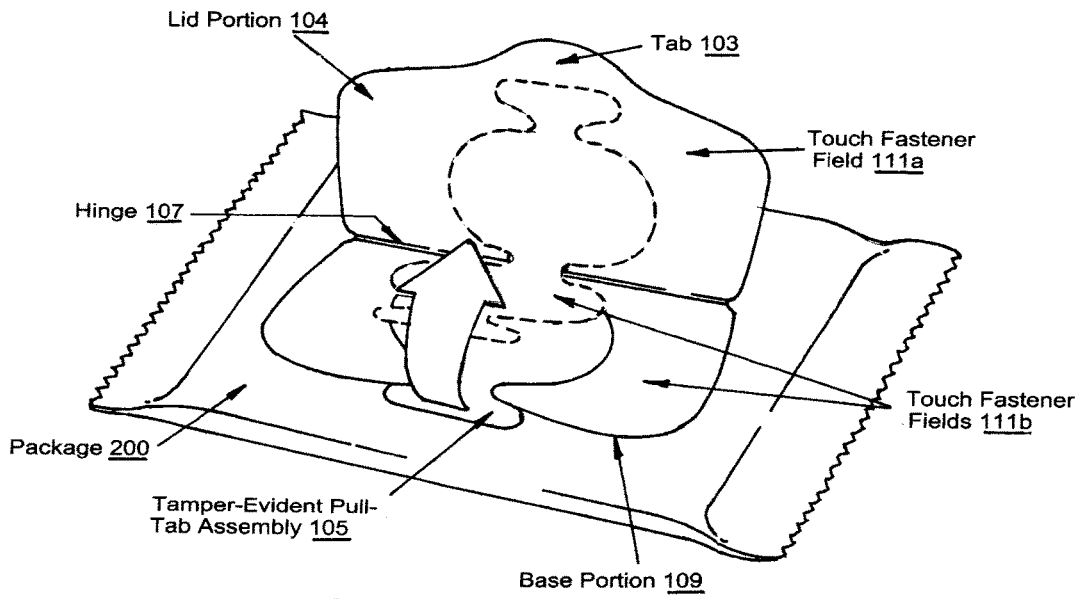
FIG. 2a illustrates a perspective view of the initial opening of a package using a reusable package closure system configured in accordance with an embodiment of the present disclosure.

FIG. 2a illustrates a perspective view of the initial opening of a package using a reusable package closure system configured in accordance with an embodiment of the present disclosure. As can be seen, the closure 101 is deployed on a flexible bag-like package 200. The initial opening of the package is a two-step process. First, the user opens the lid 104, thereby exposing the pull-tab assembly 105. The user can, at this point, inspect the tamper-evident features 105a to make sure the package has not yet been opened. For this part of the opening process, note that the holding force between the touch fastener fields 111a and 111b is much less than the force needed to tear the frangible region free of the package 200. Then, the user can complete the opening the process by lifting the non-stick area 105c of the pull-tab assembly 105 and peeling that assembly back toward the lid and up to the hinge 105b, as generally depicted by the upward pointing arrow. Here, the pulling force applied by the user is sufficient to liberate the underlying frangible package region that is bonded to the underside of the pull-tab assembly 105, thereby creating the product access port 206 in package 200 and providing access to product 208 stored therein. To this end, the bond between the underlying frangible package region and the underside of the pull-tab assembly 105 is much stronger than the tear-resistance of the frangible region, as planned. The peeled-back pull-tab assembly 105 can then be stowed against the lid, as shown in the dashed outline of FIG. 2a. The pull-tab assembly 105 can now remain in that stowed location on the lid 104, so as to provide a plug-like feature that seats back in or over the product access port 206 when the lid is put back in the closed position.

Figure 2B:
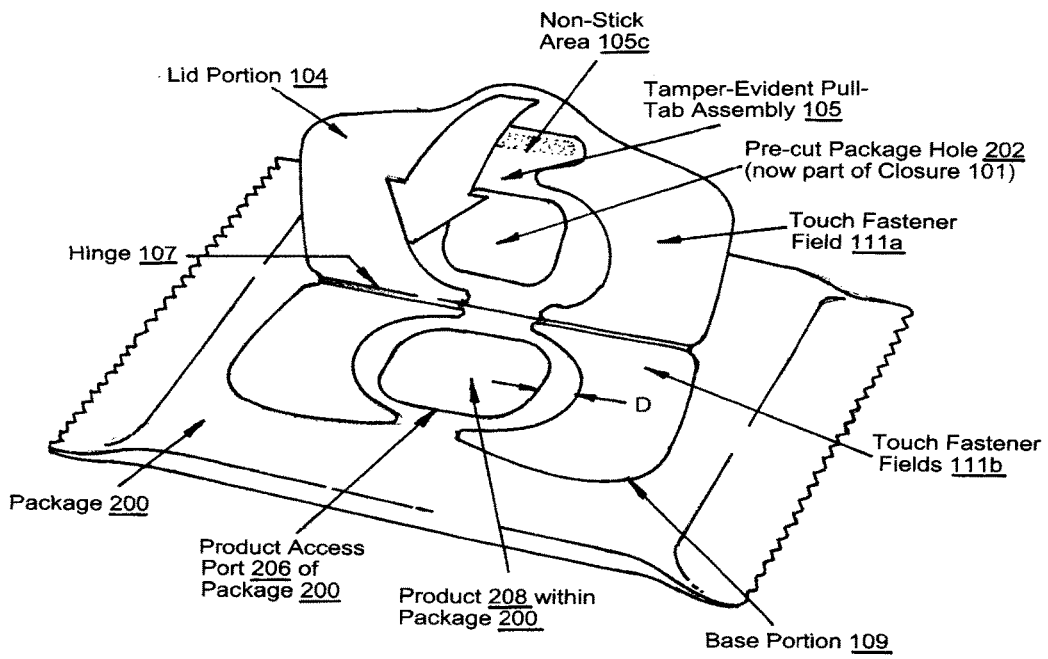
FIG. 2b illustrates a perspective view of the closing of a package using a reusable package closure system configured in accordance with an embodiment of the present disclosure.

FIG. 2b illustrates a perspective view of the closing of a package using a reusable package closure system configured in accordance with an embodiment of the present disclosure. As can be seen by the downward pointing arrow, the package can be closed by the user pulling down on tab 103 of the lid 104, which in turn causes the stay-open flaps 107b (if present) to yield, and the stowed plug to seat back into or over the product access port 206 as the lid 104 is put back in the closed position. Note that the frangible region (pre-cut package hole 202) is now part of the closure 101. In addition, the touch fastener fields 111a and 111b engage with one another to further secure the closure 101 in the closed position. Next time the user opens the lid by pulling up on tab 103, the stowed plug assembly 105 will remain stowed against the lid by operation of the interface between the touch fastener field 111a of the lid and the touch fastener field 111b of the assembly 105.

With further reference to FIG. 2b, note that the thickness D of the package material remaining between the cut-line defining the pull-tab assembly 105 and the perimeter of the product access port 206 can vary from one embodiment to the next, and can be set to accommodate a given registration tolerance associated with the process of placing the closure 101 on the package material having a pre-cut hole 206. As previously explained, other embodiments may not have such a constraint with registration, such as cases where the pre-cut hole 206 is provided simultaneously with the cut-line of the pull-tab assembly 105. Further note that the thickness D need not be uniform. Further note that this area may or may not include adhesive or bonding agent. To this end, the holding force of any adhesive about the perimeter of the product access port 206 is much less than the holding force of the interface between the fastener field 111a of the lid and the fastener field 111b of the assembly 105. In other embodiments, the adhesive about the perimeter of the product access port 206 is deactivated or otherwise not present or effective.

Figure 2C:
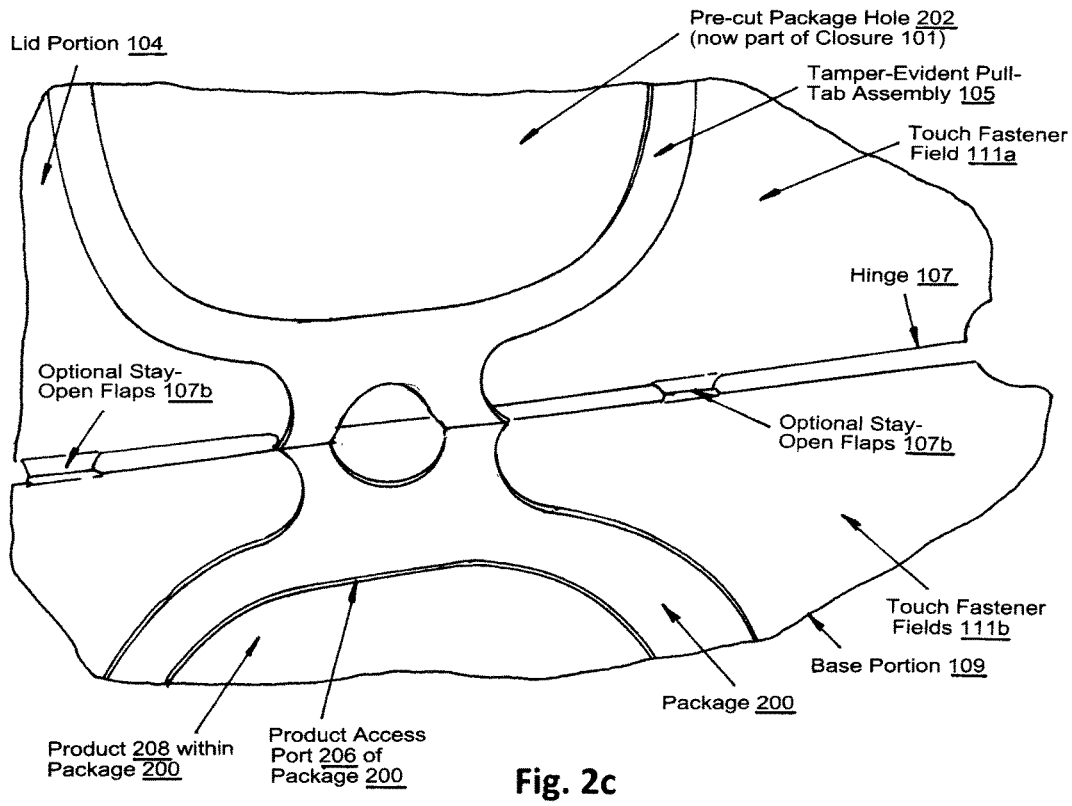
FIG. 2c illustrates a partial perspective view showing various example details of a reusable package closure system configured in accordance with an embodiment of the present disclosure.

FIG. 2c illustrates a partial perspective view showing various example details of a reusable package closure system configured in accordance with an embodiment of the present disclosure. As can be seen, the tamper-evident pull-tab assembly 105 is stowed against the lid 104, by operation of the touch fastener field 111a of the lid and touch fastener field 111b of the pull-tab assembly 105. In addition, the optional stay-open flaps 107b can be seen as they bow outward from the hinge 107 and create a spring-like effect that effectively biases the lid 104 to stay-open. Also shown in detail is the pull-tab hinge assembly 105b, which includes a two-prong configuration where extra hinge material in the middle area is removed or cut as shown, thereby allowing the hinge 107 to be pulled fully back and to reduce the contact area between the stowed pull-tab assembly (lid-based plug) 105 and the package so as to yield better performance as previously explained.

As previously explained, the base 109 can be located on a package 200 such that a frangible region of the package 200 is located within the perimeter of the pull-tab assembly 105. Although not actually present in FIGS. 1a-c, the frangible region is generally depicted with a perforated line and is designated as the pre-cut package hole 202. The pre-cut frangible region 202 is further shown in FIGS. 2b and 2c. Further note that the frangible region 202 is depicted as being centrally located within the perimeter of the pull-tab assembly 105, but it may meander from one edge to the other or otherwise follow an irregular and/or off-center path within the perimeter of the pull-tab assembly 105, in some embodiments. For instance, placement of the base 109 on the package 200 may cause the frangible region 202 to be offset within the perimeter of the pull-tab assembly 105.

The product 208 within the package 200 can be any product, but in one example case is an interleaved stack of wet wipes. Numerous other suitable products will be apparent. The package 200 can be implemented with any suitable package materials, such as polyester or polypropylene (e.g., 48 to 60 gauge, either gloss or matt) combined with a sealant layer of low density polyethylene. Other example embodiments may have package 200 implemented with bags of high density polyethylene and polypropylene. In a more general sense, package 200 can be any flexible material or combined/laminated materials such as polyethylene, polypropylene, polyester (e.g., polyethylene terephthalate or so-called PET), or any other suitable flexible packaging material. In alternative embodiments, note that the package 200 can be a rigid or semi-rigid package (such as those produced by Tetra Pak Inc.), if so desired. As will be further appreciated, details such as the shape, color, degree of transparency (if any), and aesthetic design (if any) of the package 200 can be adjusted as desired.

A bonding agent is used to secure the closure 101 to the underlying package 200. In some example embodiments, the bonding agent is implemented with adhesive. However, other embodiments may include any alternative bonding agents such as those resulting from an ultrasonic weld or heat application or any other suitable bonding process (e.g., vulcanization or other chemical bonding) or a combination of bonding agents (e.g., adhesive+weld). In a more general sense, the disclosure herein equally applies to any suitable bonding schemes, where bonding agent includes a bonding interface layer resulting from material deposition (e.g., adhesive), physical-based surface manipulation (e.g., ultrasonic weld or a controlled melt), chemical-based surface manipulation (e.g., vulcanization), and/or other bonding process. Further note that the pull-tab assembly area 105 is co-located with the product access port 206 of the underlying package 200.

Hinging Features

Figure 2D:
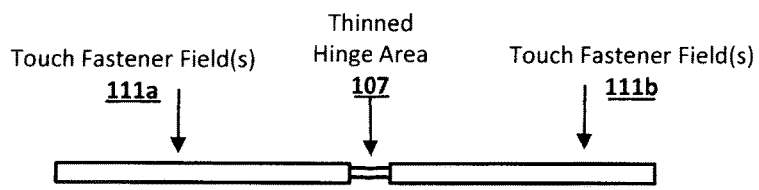
FIGS. 2d-e illustrate example hinging techniques for a reusable package closure system configured in accordance with an embodiment of the present disclosure.
Figure 2E:
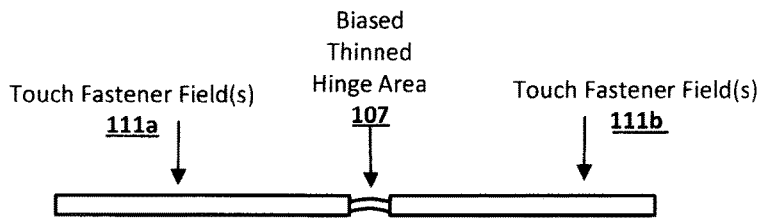

In some embodiments, the hinge 107 may be implemented, for example, with a fold line, such as a thinned portion of the closure where the lid 104 is joined to or otherwise integrally formed with the base 109. In some cases, the hinge 107 may be biased or otherwise configured to stay in the open position when the lid touch fasteners 111a are not engaged with the base touch fasteners 111b. This thinning or biasing can be accomplished, for example, using heat and a rotary die shaping element that thins or otherwise profiles the hinge area 107 as shown in the cross-sections depicted in FIGS. 2d and 2e. The open position may be, for example, the case where the back of the lid 104 is laying on the packaging material 200 or otherwise close thereto so as to reduce its interference with the product access port of the package 200. In other such embodiments, the lid 104 may be biased to an open position that forms an acute angle with the package 200 surface behind the closure, so that the lid 104 is open more than 90 degrees relative to the base 109. Note that while the hinging techniques (as well as other features) may be discussed herein with reference to a specific embodiment (such as FIGS. 1a-c), those same hinging techniques/features can be used with any other configurations or embodiments provided herein, as will be appreciated in light of this disclosure.

Figure 7A:
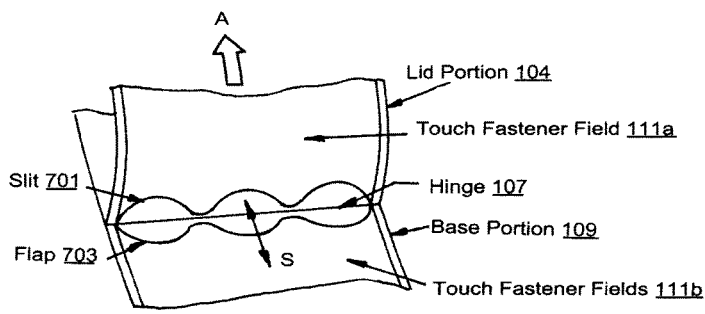
FIGS. 7a-b collectively illustrate an anti-peel hinging technique that can be used by a reusable package closure system configured in accordance with another embodiment of the present disclosure.
Figure 7B:
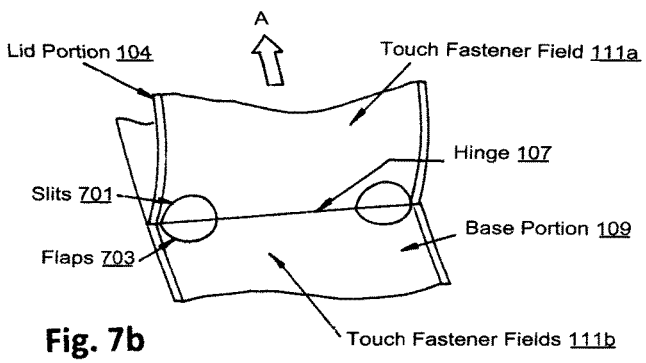

FIGS. 7a-b each illustrates a hinging technique that can be used by a reusable package closure system configured in accordance with another embodiment of the present disclosure. In this example case, hinge 207 includes an anti-peel feature that prevents or otherwise inhibits complete removal of the lid. In particular, slits 701 are cut into the lid 104 so as to define flaps 703. The touch fasteners 111a on the lid 104 (including the flaps 703) operatively engage the touch fasteners 111b on the base portion 109. The hinge 107 may be formed, for example, in a similar fashion as shown in any of FIGS. 2d-e, or as otherwise explained herein, although any number of hinging schemes can be used. FIGS. 7a and 7b show example release progressions of two example anti-peel configurations, respectively, in accordance with the present disclosure. As the lid portion 104 is pulled from the base portion 109 in the direction indicated by arrow A, flaps 703 remain engaged with the touch fastener field 111b, thereby drawing those flaps 703 from the lid portion 104 until they can be past perpendicular and up to approximately 180° relative to the lid portion 104. Consequently, a peel force that is applied to the lid portion 104 to disengage the lid portion 104 from the base portion 109 becomes a shear force at flaps 703 in the direction indicated by the arrow S (shown in FIG. 7b), thereby providing an anti-peel effect. As such, the user will be less likely to completely remove the lid 104 or otherwise damage the hinge 107. Additional details regarding such anti-peel features can be found, for example, in U.S. Pat. Nos. 8,545,740 and 8,051,540, each of which is herein incorporated by reference in its entirety.

Figure 3:
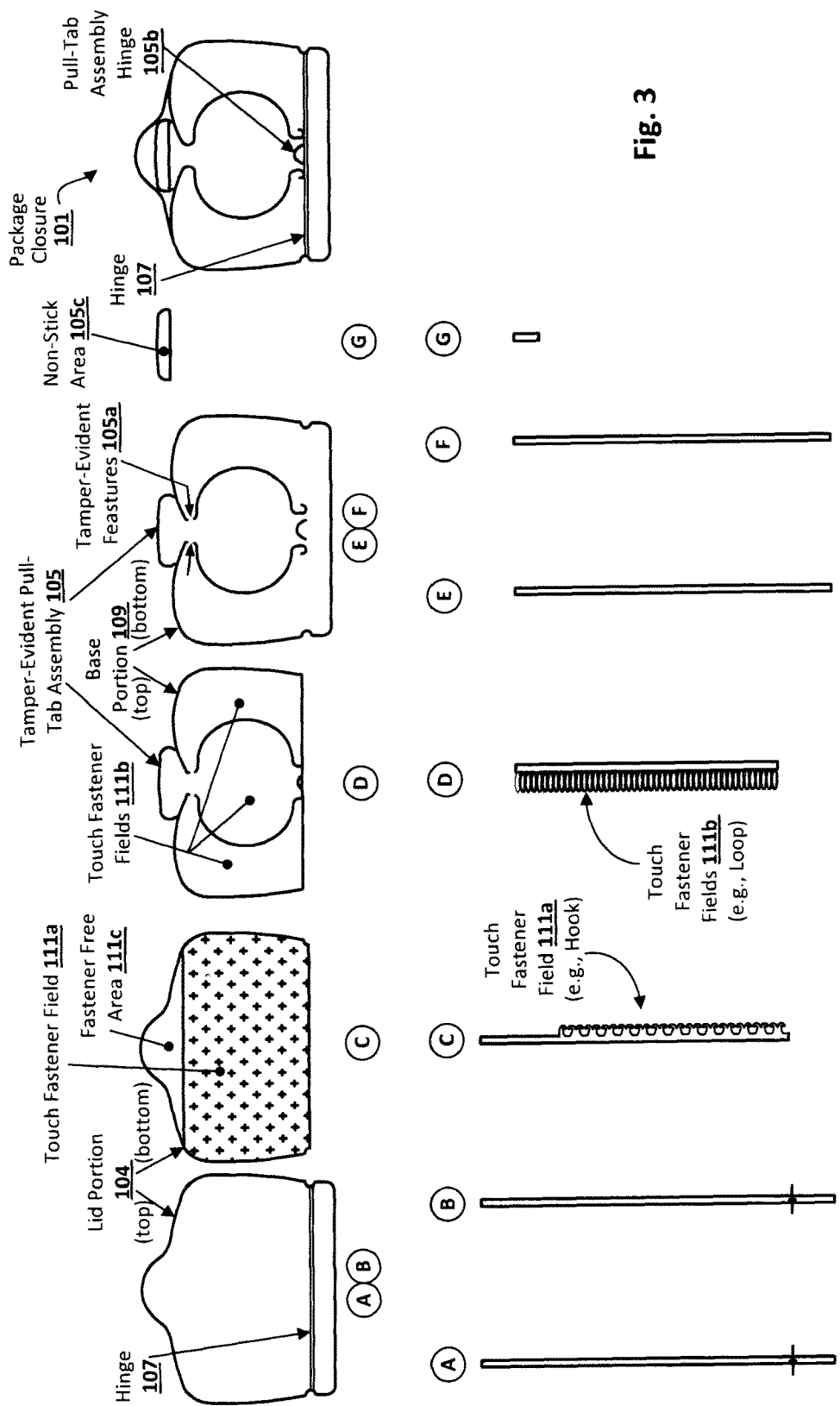
FIG. 3 shows the various layers that make up a reusable package closure system configured in accordance with an embodiment of the present disclosure.

FIG. 3 shows top and side views of the various layers that make up a reusable package closure system configured in accordance with an embodiment of the present disclosure. As can be seen, there are seven different layers (A through G) that make up this specific example embodiment. Layers A, B, and C form the lid portion 104, and respectively include a label stock polypropylene film (A) which can be printed upon, a stiffener polypropylene film (B), and a hook layer (C) having a hookless portion (to provide the fastener-free area 111c). Layers D, E, and F form the base portion 109, and respectively include a loop layer (D), a stiffener polypropylene film (E), and a label stock polypropylene film (F) that can be printed upon. An easy-peel label (G) can be provided for the non-stick area 105c. Numerous other suitable materials can be used, and the present disclosure is not intended to be limited to polypropylene film or any other material for that matter. As will be further appreciated, the thickness of the layers can be set accordingly, depending on factors such as desired rigidity and size of closure.

In one specific example configuration, the collective thickness of layers A, B, and C is in the range of 500 to 1000 gauge, including any bonding materials between the different layers. Likewise, a similar collective thickness can be used for layers D, E, and F. In some example such cases, the closure has the following geometry:

a. Distance from the tip of the non-stick area 105c to the tip of the tab 103, when the lid is splayed all the way open (~180 degree angle between lid and base): 100 to 105 mm.
b. Distance from the back edge of closure to the tip of the tab 103, when the lid is closed: 60 to 65 mm.
c. Distance from one end of hinge 107 to the other end: 80 to 90 mm.
d. Distance from back edge of closure 101 to hinge 107 (assuming laminated hinge): 5 to 10 mm.
e. Pre-cut package hole 202: an elliptical shape of 25 mm by 35 mm.
f. Pull-tab assembly 105 (plug portion, not counting the neck and pull-tab areas that extend outward): similar shape to hole 202 but larger: 30 to 35 mm by 45 to 50 mm, depending on registration tolerance.
g. Distance from hinge 107 to elliptical body of pull-tab assembly (i.e., length of prongs of pull-tab assembly hinge 105b): 3 to 7 mm.
h. Spacing between prongs of pull-tab assembly hinge 105b (assuming bifurcated hinge configuration): 10 to 14 mm.
i. Tamper-evident features: 1 to 2 mm (of uncut or notched material).

Numerous other packaging configurations will be apparent in light of this disclosure, and these example dimensions and geometries are not intended to limit this disclosure in any way. In other embodiments, the various features may be larger or smaller depending on factors such as the overall package size and the product within the package. Numerous closure shapes and geometries can be used to bring about the functionalities described herein, as will be appreciated in light of this disclosure.

Methodology for Making Label-Based Closures

Figure 4:
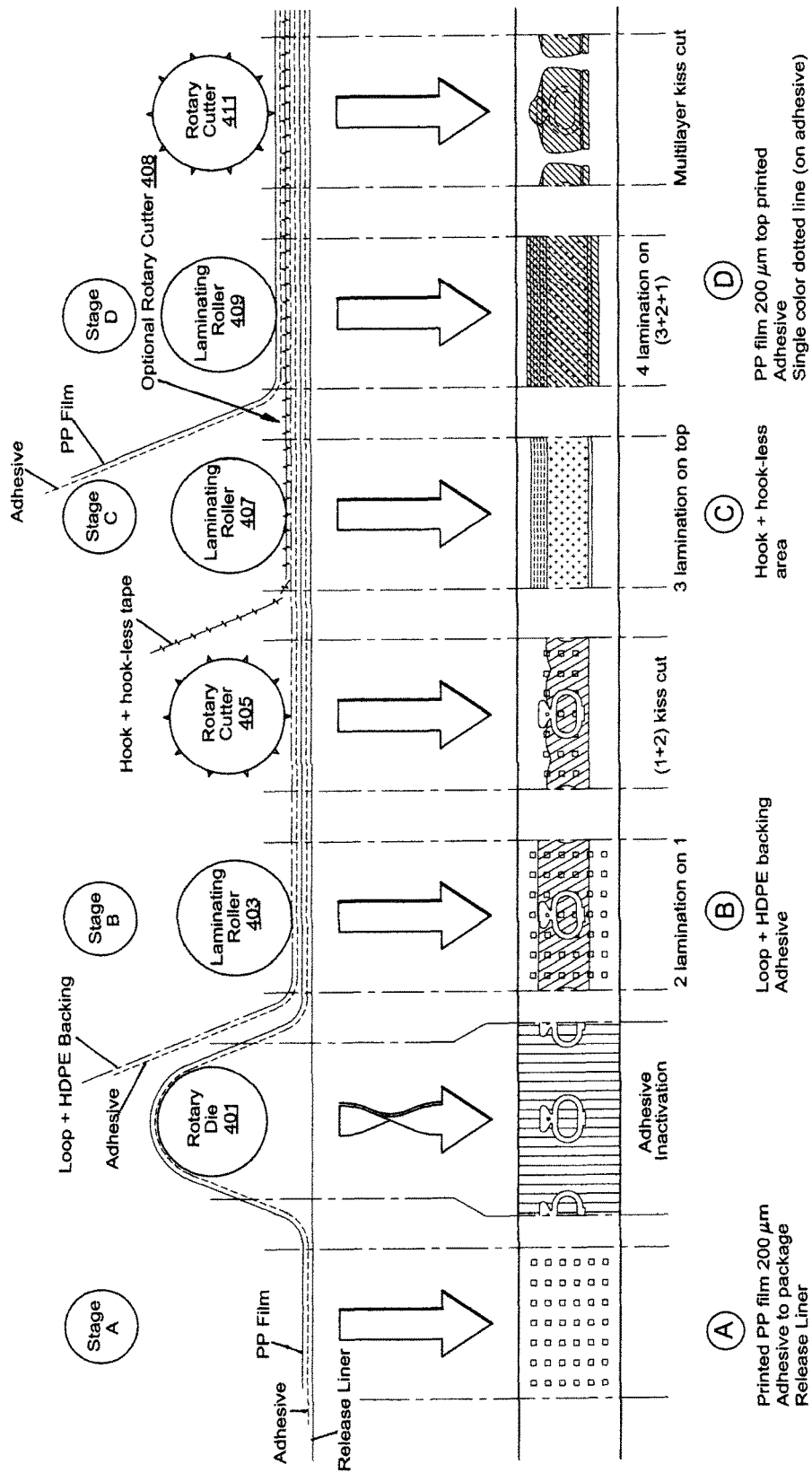
FIG. 4 shows an example lamination-based process flow for making a reusable package closure system, in accordance with an embodiment of the present disclosure.

FIG. 4 shows an example lamination-based process flow for making a reusable package closure system, in accordance with an embodiment of the present disclosure. As can be seen, this example process includes four lamination stages (A, B, C, and D) with a first cutting stage between lamination stages B and C and a second cutting stage after lamination stage D. An optional third cutting stage can be provided between lamination stages C and D. Each of these stages will now be discussed in detail.

Figure 8:
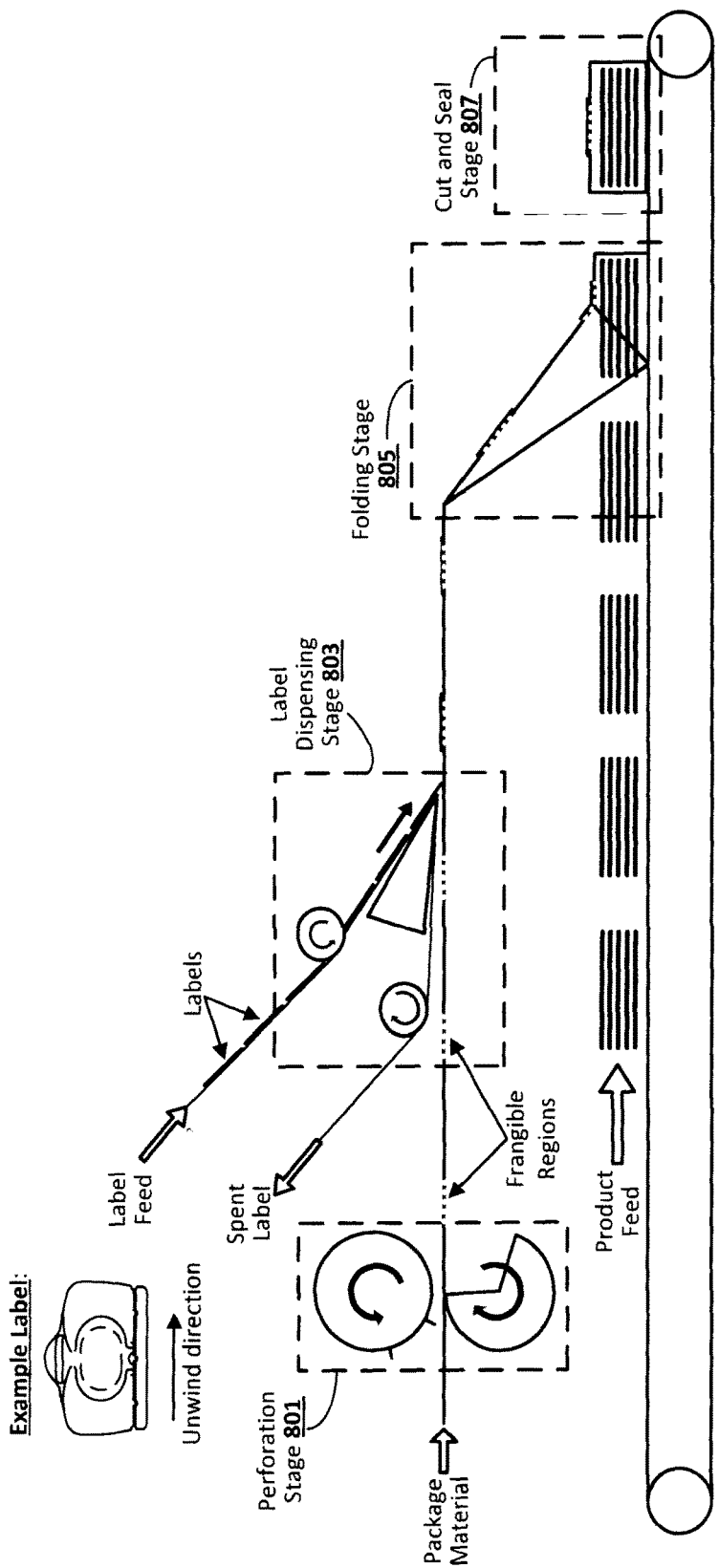
FIG. 8 illustrates a packaging process that utilizes a reusable package closure system configured in accordance with an embodiment of the present disclosure.

The first lamination is a pre-laminated feed to the stage A includes a layer of polypropylene film (having a thickness of about 200 µm), a layer of adhesive that will be used to hold the closure to the package, and a release liner for protecting the adhesive layer until the closure is deployed onto packaging material (e.g., FIG. 8). Other embodiments may include the lamination process to form this first lamination, as will be appreciated. The polypropylene film may be printed on, such as at least one of a branding logo and decorative markings and design.

In this embodiment, stage A optionally includes a mechanism for deactivating a portion of the adhesive layer. As can be seen, the deactivated adhesive area is depicted as a darkened outline having the shape of the pull-tab assembly 105 and generally corresponds to the thickness D (see FIG. 2b) of the package material remaining between the cut-line defining the pull-tab assembly 105 and the perimeter of the product access port 206. In other embodiments this D area may not include any adhesive to begin with (by way of selective deposition in forming the initial lamination of the polypropylene film, adhesive and liner provided at stage A). In still other embodiments, the adhesive in the D area is left intact, and operates to assist in securing the lid 104 in the closed position after the initial opening, so long as the holding force of the touch fasteners 111a/b between the pull-tab assembly 105 and lid 104 is stronger than the holding force of the adhesive in that area D. Further note that this area D effectively provides a seat for the lid-based plug.

As can be further seen, the mechanism for carrying out this optional adhesive deactivation is configured to temporarily separate the liner from the adhesive and to apply the deactivation agent via a rotary die to which the deactivation agent is fed. The deactivation can be, for example, varnish or a lacquer treatment suitable to deactivate or otherwise suppress the adhesive qualities of the adhesive layer. In this example embodiment, the rotary die 401 is configured with a relief pattern having a raised portion that receives a coating of the deactivation agent and then selectively applies that agent in the corresponding pattern to area D of the adhesive layer of the feed. As the rotary die turns, the raised pattern is refreshed with deactivation agent so that an appropriate amount of agent is available for the next pass over the adhesive layer. In other embodiments, the deactivation agent can be applied by way of a positive relief printing (e.g., flexographic), or screen-printing. In still other embodiments, the deactivation agent is applied only to the non-stick area 105c of the pull-tab assembly 105. In any such cases, once the pattern of deactivation agent is applied, the adhesive layer is rejoined with the release liner at the output of rotary die 401, and the first lamination is provided to the next stage, B, for further forming and processing.

As can be seen, stage B includes a laminating roller 403 which receives the first lamination from stage A and a second feed. The second feed in this example case includes a loop layer including a velour or other suitable loop material pre-bonded with a high density polyethylene (HDPE) or other suitable film backing, and an adhesive layer. Note that this film could be printed with, for example, a product logo or other information, which would remain visible after the forming process. The second feed is laminated on top of the polypropylene layer of the lamination from stage A via that adhesive layer. As will be appreciated in light of this disclosure, the first and second laminations provide the raw materials for the base 109 of the closure 101, including the touch fastener field 111b and pull-tab assembly 105. The loop can be, for example, knit loop elements although any suitable loop elements can be used as will be appreciated.

Figure 5A:
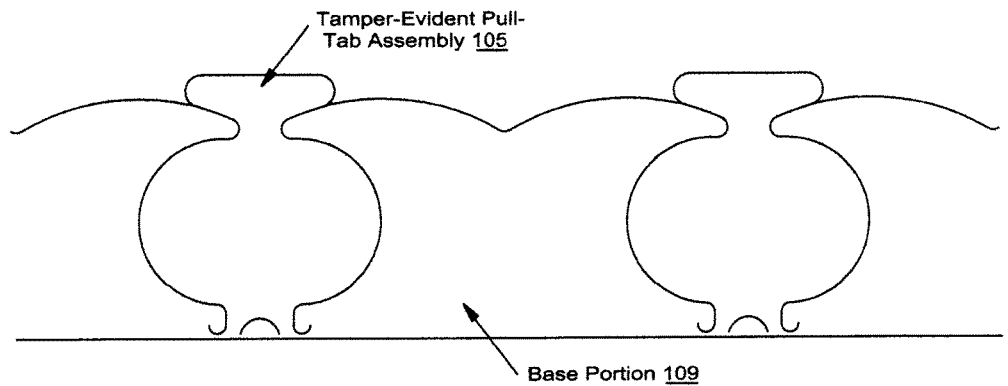
FIGS. 5a-c show example rotary cutting tool patterns that can be used to make a reusable package closure system configured in accordance with an embodiment of the present disclosure.

The output of stage B is then provided to the first cutting stage. In particular, rotary cutter 405 is configured to kiss cut the laminated layers. By way of background, a kiss cut is a type of die cutting, where the machine or tool is adjusted at a point where all the upper layers are cut except the release liner (a relatively thin film, in this case, which acts as a carrier and is provided with the first lamination). In this way, the blades of the cutter 405 only slightly touch or 'kiss' the release liner without cutting or damaging it. This type of cut is also sometimes referred to as a middle cut. FIG. 5a shows the cut pattern applied by cutter 405, in accordance with one embodiment. Note the various features of the pull-tab assembly 105 formed by the cut, including the hinge 105b and any tamper-evident features 105a, as well as the neck and pull-tab region.

The output of cutting stage 405 is then provided to the lamination stage C. In particular, a feed of high technology hook (HTH) tape is laminated on to the top of the now patterned loop side of the lid portion, by operation of lamination roller 407. The hinge 107 is also formed by this lamination process. In particular, the lamination roller 407 is also configured to provide a fold line for the hinge. This fold line can be, for example, a thinned portion of the laminated materials making up the lid 104. Note that the HTH tape includes a hook area and an area without hooks which will be at the top portion of the lid 104. Such hookless-hook tape can be formed, for example, via an extruding process or any other suitable forming technique using materials such as polyethylene and polypropylene. As will be appreciated, the hooks provide the touch fastener field 111a and the hookless area provides the fastener free area 111c, in this example embodiment. Further note that other embodiments may have the hook and loop reversed (hook on base, loop on lid), or may employ a hook-to-hook configuration (hook on both lid and base).

The output of lamination stage C is then provided to lamination stage D, wherein laminating roller 409 is used to laminate a sheet of polypropylene to form the top of the lid (side opposite the hook side). In particular, this example case includes a feed of 200 µm polypropylene film and a layer of adhesive that will be used to bond the top part of the lid 104 to the backside of the HTH lamination. The polypropylene film may be printed on, such as at least one of a branding logo, decorative markings and design, and informational text (e.g., "open here"). In addition to printing on the top of the lid 104, there can be printing on the inside. For example, in one embodiment, a single color dashed line can be printed on the adhesive which adheres to the HTH lamination, so as to show the profile of the location where the pull-tab assembly 105 is to be stowed against lid 104, such as shown in FIG. 2a. Note that the lid area behind the hinge line is formed by this lamination process, and may or may not include hook material.

Figure 5B:

As can be further seen in FIG. 4, an optional cutting stage configured with rotary cutter 408 can be provided between lamination stages C and D, where the optional stay-open flap 115 features are formed in the lid 104 layers via a kiss cut operation. FIG. 5b show shows the cut pattern applied by cutter 408, in accordance with one embodiment. Note that the stay-open flaps 115 can be spaced from one another along the hinge line, as shown in FIG. 1a, so as to provide a flap proximate each end and in the middle of the hinge 107. As will be appreciated, when the lid 104 is pressed to the open position by the user, the flaps 115 flip inward and bias against the base to keep the lid open. However, the force applied by the user to close the lid 104 easily overpowers the flaps 115. Numerous such configurations will be apparent in light of this disclosure.

Figure 5C:
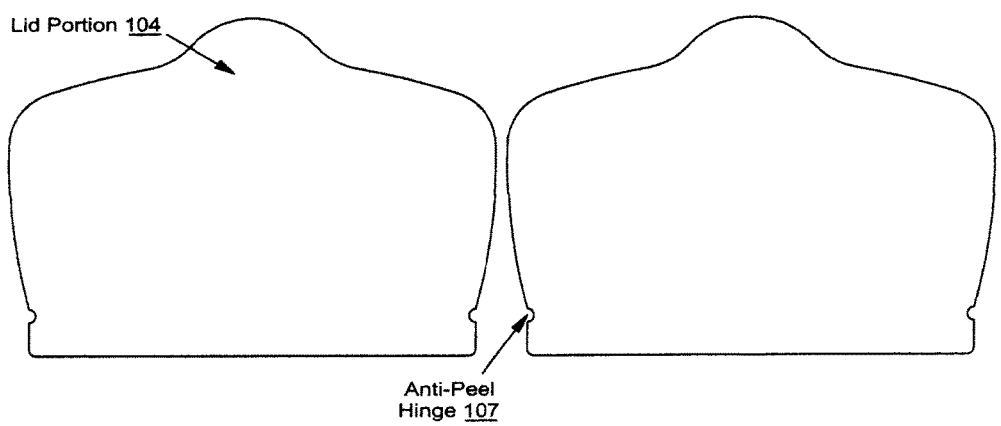

The output of lamination stage D is then provided to the last cutting stage. In particular, rotary cutter 411 is configured to kiss cut the laminated layers. In this case, all the layers except the liner layer are cut to define the perimeter or outline of the closure 101. In addition, the anti-peel features 107a of the hinge can be kiss cut down through the lid layers where the cutter 411 just kisses the underlying layer. FIG. 5c shows the cut pattern applied by cutter 411, in accordance with one embodiment. Note the various features of the closure 101 formed by the cuts provided by cutter 411, including the overall lid and base shapes including tab 103.

Waste is extracted from the resulting string of label-based closures output at cutting stage 411, so as to effectively provide a label output that can be rolled or folded (e.g., zig-zag pattern for fanfold dispensing from a box or other storage container) and stored for later use in a flow-wrap process or provided directly to the label feed stage of such a process. As will be appreciated, note that the present disclosure is not intended to be limited to rotary die cutting; rather, any suitable cutting mechanisms can be used (e.g., semi-rotary die cut, flatbed die cutter, laser cutter, etc).

Figure 6:
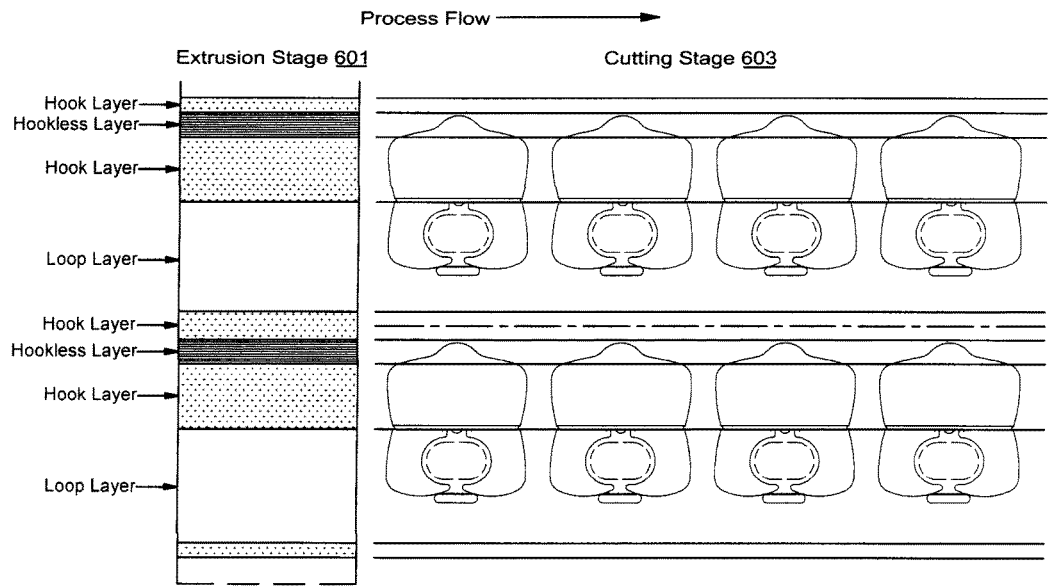
FIG. 6 shows an example extrusion-based process flow for making a reusable package closure system, in accordance with an embodiment of the present disclosure.

In another specific embodiment, a strip of hook-and-loop tape is formed by the process described in U.S. Pat. No. 8,549,714, which is herein incorporated by reference in its entirety. As explained therein, edge margins of a strip of non-woven material bond intimately with edge margins of the molten resin with which a strip of hook fasteners are integrally formed. The bond between the two strips is formed by encapsulating fibers of the loop material with the molten resin of the hook material, thereby forming a composite structure of joined strips of loop and hook components. The resulting strip of hook-and-loop tape can then be, for instance, laminated with suitable backing materials (e.g., 200 μm polypropylene), and can then be presented to a rotary die cutting process to form the closure 101. In such a case, the closure is formed in the open state, so a first cutter can be provided to provide the base portion cuts and a second cutter can be provided to provide the lid portion cuts. Alternatively, a single cutter can be used to cut both the base and lid portions simultaneously. One such example embodiment is shown in FIG. 6, wherein a double-wide hook-and-loop tape configuration is extruded via an extrusion stage 601. As can be seen, the extrusion includes hook areas, a hookless area, and a loop area. Other embodiments may further include an area with gripping features (that correspond to the tab area 103, for instance). The tape configuration allows the closure to be formed open position and to be cut in a single cutting stage 603, as previously explained. The formed closures 101 can then be closed and the excess liner material be cut away, so as to provide a reel of labels just as with the process shown in FIG. 4.

Methodology for Packaging

FIG. 8 illustrates a packaging process that utilizes a reusable package closure system configured in accordance with an embodiment of the present disclosure. Note that the label-based closures used in this example flow are complete once secured to the package material. As can be further seen, the process generally includes a perforation stage 801, a label dispensing stage 803, a folding stage 805, and a cut-and-seal stage 807. Each of these stages can be implemented using a standard flow-wrap machine. Customizations unique to the present disclosure will be apparent.

In operation, package material is received at the perforation stage 801, which generally includes two oppositely rotating wheels that are configured to perforate the package material thereby defining a frangible region (pre-cut package hole 202). The perforated package material is then fed to the label dispensing stage 803, which also receives a feed of label-based closures configured as provided herein. As can be further seen, the label feed is effectively registered with the package feed, such that the closures (or so-called labels) are peeled from the label liner and applied over the area within the frangible region (defined by a ring-shaped perforation in this example case). In particular, the label is applied such that the touch fastener field of the pull-tab assembly of the label lands within the perforated region of the package material, such as variously shown in FIGS. 1b-c. A tamping roller may be used to further secure the dispensed label-based closure to the underlying package material. The label waste is directed away from the process.

The labelled and perforated package material is then provided to the folding stage 805, which is configured to receive a product feed (e.g., stack of interleaved wet wipes, or any other product) and to wrap that product in the packaging material as normally done. The folding stage may further provide the lateral package seam, so as to form a package tube. The wrapped product is then provided to a conventional cut-and-seal stage 807, which trims any excess packaging material and seals the end seams to complete the flow-wrap packaging process. In other embodiments, the cut-and-seal stage 807 may also provide the lateral package seam that generally runs orthogonal to the end seams. The resulting package can then be boxed and shipped. Note that the product may be shipped with the closure in a closed or open position, and when opened for the first time the closure can be configured to remove the sacrificial area within the perforated or otherwise frangible region of the package so as to provide access to the product therein. In still other embodiments, such as those having enhanced peel strength in the lid area, the closure may be configured to remove the underlying package material even if that material is not perforated or otherwise frangible.

In an alternative embodiment, the label-based closures used are only partially formed and can be completed during the flow-wrap process. In particular, the pull-tab assembly 105 of the closures is not yet formed. Nor is the frangible region 202 in the package material, such no registration is required when deploying the label onto the package material. As will be appreciated, the process may include stages similar to those shown in FIG. 8, including a perforation/cutting stage 801, a label dispensing stage 803, a folding stage 805, and a cut-and-seal stage 807, except that the perforation/cutting stage 801 would be located after the label dispensing stage 803 in the process flow and may be further configured to complete the closure formation. Such a configuration can be used, for example, to eliminate or otherwise minimize the need to register the label feed with the underlying package material feed. In particular, there is no need to align the pull-tab assembly 105 of the label-based closure with a pre-cut frangible region 202 of the package material.

So, in accordance with one example embodiment, the label-based closure pull-tab assembly 105 can be formed at substantially the same time as the frangible region 202 in the package material. This can be accomplished, for example, by a properly configured perforation/cutting stage 801. For example, in one such case, the compressibility of the material stack (e.g., including fastener field 111b, bonding agent, backing material, and package 200) as it passes under the rotary die cutter 801 is such that the cutting elements of the cutter 801 pass through the base portion 109 of the stack to clean cut or otherwise liberate the touch fastener field 111b and bonding agent and backing material, while only perforating or otherwise weakening the package 200. In one such case, the rotary cutter 801 could be configured, for example, with a series of base cutting elements configured with perforating pins or cutting points that further extend orthogonally from the base cutting elements, thereby providing a multi-level cutting tool. The base cutting elements can be used to liberate the pull-tab assembly 105 of touch fastener field 111b while the further extended perforating pins are adapted for forming the frangible region 202.

In another embodiment, multiple cutting stages can be used, such that one rotary die cutter could include the base cutting elements for liberating the pull-tab assembly 105 of touch fastener field 111b, and another rotary die cutter could include the perforating pins adapted for forming the frangible region 202. The order of the cutting operations can be either way. In a more general sense, any suitable process for forming the desired cuts can be used. In any case, note that once the partially formed label is provisioned onto the package material, the need for registration of the two feeds is effectively eliminated. Further note that simultaneously cutting ensures that the frangible region is automatically co-located with the buffer zone. Again, the rotary die cutter can be replaced with other suitable cutting tools, such as a flatbed die cutter, laser cutter capable of cutting, shaping, thinning as variously explained herein.

Variations will be apparent in light of this disclosure. For instance, in some packaging applications, the package can be formed first. Then, once the product is sealed within the package, the closure can be applied to the package over an area having a pre-cut frangible region. The closure may be configured as variously provided herein, and may be flexible or rigid. The package may also be flexible or rigid. The product within the package may literally be any product that can be packaged (e.g., moist goods such as wet wipes and medical wipes, dry edible goods such as cereal or oats or other edible materials, hardware such as nuts and bolts, non-edible dry goods such as detergents and household cleaners, tissues or paper towels, or a bank for storing coins and such).

FURTHER EXAMPLE EMBODIMENTS

The following examples pertain to further embodiments, from which numerous permutations and configurations will be apparent.

Example 1 is a reusable closure system. The system can be used, for example, in packaging applications that include use of a frangible region to provide access to packaged product. The closure system includes a base configured to be bonded to underlying package material (by way of adhesive or weld, or other suitable bonding agent). The base includes a first field of touch fasteners having one or more cut-lines therein defining a hinged pull-tab assembly. The system further includes a hinged lid configured for movement between open and closed positions relative to the base. The lid includes a second touch fastener field that is complementary to the first touch fastener field, such that the first and second touch fastener fields engage with one another to provide a secure closure when the lid is in the closed position. Upon opening of the lid, the hinged pull-tab assembly is exposed so that the pull-tab assembly can be peeled back to its hinge while simultaneously removing a frangible region of the packaging material to which the base can be bonded. The peeled-back pull-tab assembly can be securely stowed against the lid by operation of the first and second touch fastener fields thereby providing a lid-based plug configured to engage the resulting hole in the packaging material when the lid is in the closed position.

Example 2 includes the subject matter of Example 1, wherein the first and second touch fastener fields comprise at least one of hook and loop fastener elements.

Example 3 includes the subject matter of Example 1 or Example 2, wherein the first touch fastener field comprises loop fastener elements, and the second touch fastener field comprises hook fastener elements.

Example 4 includes the subject matter of any of the previous Examples, wherein prior to its initial opening, the hinged pull-tab assembly comprises one or more tamper-evident features that visually indicate the hinged pull-tab assembly has not been opened.

Example 5 includes the subject matter of any of the previous Examples, wherein the hinged pull-tab assembly comprises a non-stick tab area that can be grabbed to peel back the hinged pull-tab assembly.

Example 6 includes the subject matter of any of the previous Examples, wherein the hinged pull-tab assembly comprises a multi-prong hinge.

Example 7 includes the subject matter of Example 6, wherein the multi-prong hinge has two prongs.

Example 8 includes the subject matter of any of the previous Examples, wherein the lid is further configured with one or more stay-open flaps that bias the lid to stay-open after the lid is opened.

Example 9 includes the subject matter of any of the previous Examples, and further comprises one or more anti-peel features configured to prevent the hinged lid from being fully removed during opening.

Example 10 includes the subject matter of any of the previous Examples, and further comprises one or more anti-peel features configured to prevent the hinged pull-tab assembly from being fully removed during opening. Note that anti-peel features of the pull-tab assembly can be used to protect the lid as well, once the pull-tab assembly is stowed against the lid. For example, in one embodiment, once the plug loops are attached to the hooks on the lid, then there is a shear effect between the touch fasteners, which acts against the peel of the hinge. Thus, when opening the lid with the pull-tab assembly (plug) stowed against the lid, the prong or prongs of the pull-tab hinge initially take the brunt of that pull force, by means of the shear connection between the touch fasteners.

Example 11 includes the subject matter of any of the previous Examples, wherein the one or more cut-lines therein defining a hinged pull-tab assembly are configured to provide a first hole that is larger than and surrounds the frangible region such that the resulting hole, after the frangible region is removed by operation of the pull-tab assembly, has a perimeter that is spaced inward from the perimeter of the first hole, thereby providing a seat for the lid-based plug. In some embodiments, the plug effectively enhances the ability of packaged product, such as wet wipes, to maintain moisture content, as compared to other closures having no plug effect (such as the case with rigid plastic closures) and/or prone to adhesive breakdown (e.g., such as the case with flexible plastic flaps that are adhered to the bag and over the underlying hole via an adhesive).

Example 12 includes the subject matter of Example 11, wherein the seat for the lid-based plug includes deactivated adhesive.

Example 13 includes the subject matter of Example 11, wherein the seat for the lid-based plug includes a zone that is free of any adhesive deposition.

Example 14 includes the subject matter of Example 11, wherein the seat for the lid-based plug includes a bonding agent having holding power that is less than the holding power between the stowed pull-tab assembly and the lid.

Example 15 is a roll or fanfold of labels for use in a flow-wrap packaging process, wherein each label comprises the closure system of any of the previous Examples.

Example 16 is a container defining an interior volume. The container includes flexible sheet material bounding at least one side of the interior volume and forming an outer surface of the container, the flexible sheet material having a frangible region. The container further includes the closure system of any of the previous Examples, wherein the base is bonded to the flexible sheet material such that the hinged pull-tab assembly is bonded to the frangible region. The base and hinged lid are of greater rigidity than the flexible sheet material.

Example 17 includes the subject matter of Example 16, and further comprises usable product within in the interior volume and accessible via the frangible region once the pull-tab assembly has been stowed against the lid.

Example 18 includes the subject matter of Example 17, wherein the usable product comprises wet wipes.

Example 19 is a reusable closure system. The system includes a base configured to be bonded to underlying package material and including a first field of touch fasteners having one or more cut-lines therein defining a hinged pull-tab assembly. The hinged pull-tab assembly comprises a two-pronged hinge and a non-stick tab area that can be grabbed to peel back the hinged pull-tab assembly. Prior to its initial opening, the hinged pull-tab assembly further comprises one or more tamper-evident features that visually indicate the hinged pull-tab assembly has not been opened. The system further includes a hinged lid configured for movement between open and closed positions relative to the base and including a second touch fastener field that is complementary to the first touch fastener field, such that the first and second touch fastener fields engage with one another to provide a secure closure when the lid is in the closed position. Upon opening of the lid, the hinged pull-tab assembly is exposed so that the pull-tab assembly can be peeled back to its hinge while simultaneously removing a frangible region of the packaging material to which the base can be bonded. In addition, the peeled-back pull-tab assembly can be securely stowed against the lid by operation of the first and second touch fastener fields thereby providing a lid-based plug configured to engage the resulting hole in the packaging material when the lid is in the closed position. The first touch fastener field comprises loop fastener elements, and the second touch fastener field comprises hook fastener elements.

Example 20 is a reusable closure system. The system includes a base configured to be bonded to underlying package material and including a first field of touch fasteners having one or more cut-lines therein defining a hinged pull-tab assembly. The system further includes a hinged lid configured for movement between open and closed positions relative to the base and including a second touch fastener field that is complementary to the first touch fastener field, such that the first and second touch fastener fields engage with one another to provide a secure closure when the lid is in the closed position. Upon opening of the lid, the hinged pull-tab assembly is exposed so that the pull-tab assembly can be peeled back to its hinge while simultaneously removing a frangible region of the packaging material to which the base can be bonded. In addition, the peeled-back pull-tab assembly can be securely stowed against the lid by operation of the first and second touch fastener fields thereby providing a lid-based plug configured to engage the resulting hole in the packaging material when the lid is in the closed position. The one or more cut-lines therein defining a hinged pull-tab assembly are configured to provide a first hole that is larger than and surrounds the frangible region such that the resulting hole, after the frangible region is removed by operation of the pull-tab assembly, has a perimeter that is spaced inward from the perimeter of the first hole, thereby providing a seat for the lid-based plug. The first touch fastener field comprises loop fastener elements, and the second touch fastener field comprises hook fastener elements.

Example 21 is a method for making a reusable closure system. The method includes forming a base configured to be bonded to underlying package material and including a first field of touch fasteners having one or more cut-lines therein defining a hinged pull-tab assembly. The method further includes forming a hinged lid configured for movement between open and closed positions relative to the base and including a second touch fastener field that is complementary to the first touch fastener field, such that the first and second touch fastener fields engage with one another to provide a secure closure when the lid is in the closed position. Forming of the base and lid can be carried out, for example, by way of extrusion or lamination or a combination thereof. In operation, upon opening of the lid, the hinged pull-tab assembly is exposed so that the pull-tab assembly can be peeled back to its hinge while simultaneously removing a frangible region of the packaging material to which the base can be bonded, and so that the peeled-back pull-tab assembly can be securely stowed against the lid by operation of the first and second touch fastener fields thereby providing a lid-based plug configured to engage the resulting hole in the packaging material when the lid is in the closed position. In some embodiments, forming the base includes deactivating a portion of adhesive at the perimeter of the pull-tab assembly.

Example 22 is a packaging method. The method can be used, for example, for packaging applications that include use of a frangible region to provide access to packaged product. In one embodiment, the packaging application is a flow-wrap packaging application. The method includes: providing a feed of flexible packaging material; applying a reusable closure system to the packaging material; providing a feed of product; and wrapping a product from the product feed in the flexible packaging material, wherein the closure system provides access to the frangible region and the frangible region provides access to the product within the flexible packaging material. The reusable closure system can be configured as described in any of the preceding Examples. In some cases, note that the frangible region of the package and the cut-lines defining the pull-tab assembly can be formed simultaneously at some point after the closure is dispensed onto the package.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A reusable closure system, comprising:
   a base configured to be bonded to underlying package material and including a first field of touch fasteners having one or more cut-lines therein defining a hinged pull-tab assembly; and
   a hinged lid configured for movement between open and closed positions relative to the base and including a second touch fastener field that is complementary to the first touch fastener field, such that the first and second touch fastener fields engage with one another to provide a secure closure when the lid is in the closed position;
   wherein upon opening of the lid, the hinged pull-tab assembly is exposed so that the pull-tab assembly can be selectively peeled back to its hinge while simultaneously removing a frangible region of the packaging material to which the base can be bonded to form a resulting hole in the packaging material, and so that the peeled-back pull-tab assembly can be securely stowed against the lid by operation of the first and second touch fastener fields thereby providing a lid-based plug configured to engage the resulting hole in the packaging material when the lid is in the closed position.

2. The system of claim 1 wherein the first and second touch fastener fields comprise at least one of hook and loop fastener elements.

3. The system of claim 1 wherein the first touch fastener field comprises loop fastener elements, and the second touch fastener field comprises hook fastener elements.

4. The system of claim 1 wherein prior to its initial opening, the hinged pull-tab assembly comprises one or more tamper-evident features that visually indicate the hinged pull-tab assembly has not been opened.

5. The system of claim 1 wherein the hinged pull-tab assembly comprises a non-stick tab area that can be grabbed to peel back the hinged pull-tab assembly.

6. The system of claim 1 wherein the hinged pull-tab assembly comprises a multi-prong hinge.

7. The system of claim 6 wherein the multi-prong hinge has two prongs.

8. The system of claim 1 wherein the lid is further configured with one or more stay-open flaps that bias the lid to stay-open after the lid is opened.

9. The system of claim 1 further comprising one or more anti-peel features configured to prevent the hinged lid from being fully removed during opening.

10. The system of claim 1 further comprising one or more anti-peel features configured to prevent the hinged pull-tab assembly from being fully removed during opening.

11. The system of claim 1 wherein the one or more cut-lines therein defining the hinged pull-tab assembly are configured to provide a first hole that is larger than and surrounds the frangible region such that the resulting hole, after the frangible region is removed by operation of the pull-tab assembly, has a perimeter that is spaced inward from the perimeter of the first hole, thereby providing a seat for the lid-based plug.

12. The system of claim 11 wherein the seat for the lid-based plug includes deactivated adhesive.

13. The system of claim 11 wherein the seat for the lid-based plug includes a zone that is free of any adhesive deposition.

14. The system of claim 11 wherein the seat for the lid-based plug includes a bonding agent having holding power that is less than the holding power between the stowed pull-tab assembly and the lid.

15. A roll or fanfold of labels for use in a flow-wrap packaging process, wherein each label comprises the closure system of claim 1.

16. A container defining an interior volume, the container comprising:
   flexible sheet material bounding at least one side of the interior volume and forming an outer surface of the container, the flexible sheet material having a frangible region; and
   the closure system of claim 1, wherein the base is bonded to the flexible sheet material such that the hinged pull-tab assembly is bonded to the frangible region;
   wherein the base and hinged lid are of greater rigidity than the flexible sheet material.

17. The container of claim 16, further comprising usable product within the interior volume and accessible via the frangible region once the pull-tab assembly has been stowed against the lid.

18. The container of claim 17 wherein the usable product comprises wet wipes.

19. A reusable closure system, comprising:
   a base configured to be bonded to underlying package material and including a first field of touch fasteners having one or more cut-lines therein defining a hinged pull-tab assembly, wherein the hinged pull-tab assembly comprises a two-pronged hinge and a non-stick tab area that can be grabbed to peel back the hinged pull-tab assembly, and prior to its initial opening, the hinged pull-tab assembly further comprises one or more tamper-evident features that visually indicate the hinged pull-tab assembly has not been opened; and
   a hinged lid configured for movement between open and closed positions relative to the base and including a second touch fastener field that is complementary to the first touch fastener field, such that the first and second touch fastener fields engage with one another to provide a secure closure when the lid is in the closed position;
   wherein upon opening of the lid, the hinged pull-tab assembly is exposed so that the pull-tab assembly can be selectively peeled back to its hinge while simultaneously removing a frangible region of the packaging material to which the base can be bonded to form a resulting hole in the packaging material, and so that the peeled-back pull-tab assembly can be securely stowed against the lid by operation of the first and second touch fastener fields thereby providing a lid-based plug configured to engage the resulting hole in the packaging material when the lid is in the closed position; and
   wherein the first touch fastener field comprises loop fastener elements, and the second touch fastener field comprises hook fastener elements.

20. A reusable closure system, comprising:
   a base configured to be bonded to underlying package material and including a first field of touch fasteners having one or more cut-lines therein defining a hinged pull-tab assembly; and
   a hinged lid configured for movement between open and closed positions relative to the base and including a second touch fastener field that is complementary to the first touch fastener field, such that the first and second touch fastener fields engage with one another to provide a secure closure when the lid is in the closed position;

wherein upon opening of the lid, the hinged pull-tab assembly is exposed so that the pull-tab assembly can be selectively peeled back to its hinge while simultaneously removing a frangible region of the packaging material to which the base can be bonded to form a resulting hole in the packaging material, and so that the peeled-back pull-tab assembly can be securely stowed against the lid by operation of the first and second touch fastener fields thereby providing a lid-based plug configured to engage the resulting hole in the packaging material when the lid is in the closed position;

wherein the one or more cut-lines therein defining the hinged pull-tab assembly are configured to provide a first hole that is larger than and surrounds the frangible region such that the resulting hole, after the frangible region is removed by operation of the pull-tab assembly, has a perimeter that is spaced inward from the perimeter of the first hole, thereby providing a seat for the lid-based plug; and wherein the first touch fastener field comprises loop fastener elements, and the second touch fastener field comprises hook fastener elements.

\* \* \* \* \*